Jan. 14, 1964   D. F. REAHARD ETAL   3,117,352
NON-SLIP DOOR GASKET
Filed Feb. 21, 1961
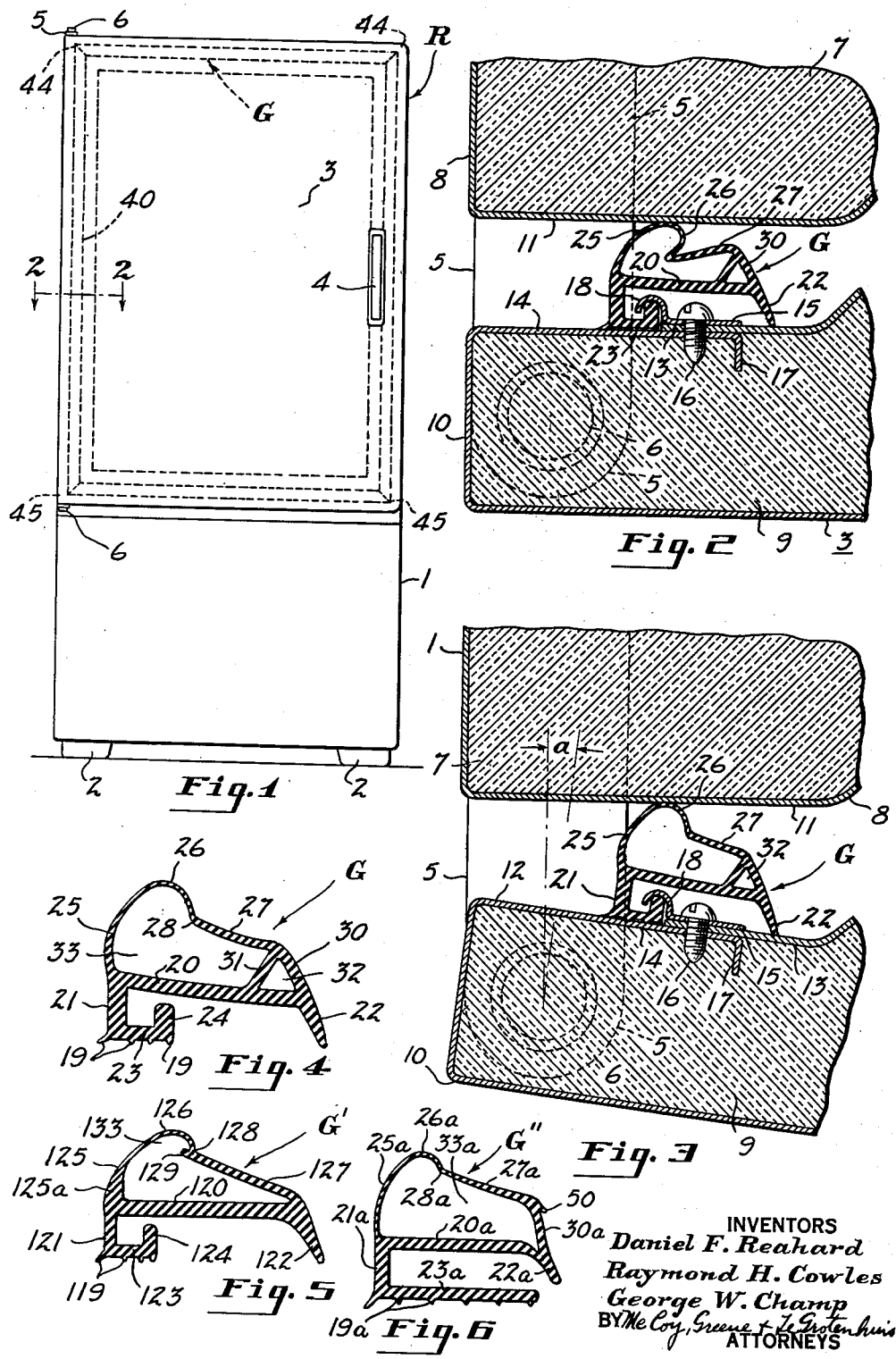
INVENTORS
Daniel F. Reahard
Raymond H. Cowles
George W. Champ
BY McCoy, Greene + TeGrotenhuis
ATTORNEYS

United States Patent Office 3,117,352
Patented Jan. 14, 1964

1

3,117,352
NON-SLIP DOOR GASKET
Daniel F. Reahard, Raymond H. Cowles, and George W. Champ, Seymour, Ind., assignors to The H. O. Canfield Company, Inc., Bridgeport, Conn., a corporation of Connecticut
Filed Feb. 21, 1961, Ser. No. 90,670
13 Claims. (Cl. 20—69)

The present invention relates to a thin-walled tubular gasket for refrigerator doors or the like and more particularly to a tubular gasket constructed to change its cross sectional shape and to avoid slipping when moved transversely, as, for example, when located near the door hinge.

Heretofore, difficulty has been encountered with refrigerator gaskets due to the transverse forces imparted to the vertically extending portion of the gasket in the region of the door hinge which caused abrading thereof and wrinkling of the horizontal sections of the gasket. The result was that the gaskets tended to wear out prematurely and did not provide a satisfactory seal.

The present invention provides a tubular gasket having a relatively thin outwardly projecting portion for providing the seal which is adapted to swing laterally while maintaining the seal so as to avoid substantial sliding movement against the face of the refrigerator or other surface being sealed. The projecting portion is supported in cantilever fashion. The special construction of the gasket not only facilitates the lateral curling of the thin projecting portion but also provides the gasket with improved permanent set qualities whereby the gasket can maintain a seal for a much longer period of time than comparable gaskets known prior to this invention. The gasket provides an excellent seal because of the large "dead air" space and the broad sealing area when the gasket is compressed. The gasket is, therefore, excellent for an entire refrigerator door as well as for the hinge side of the door.

An object of the invention is to provide a simple, inexpensive, tubular air-filled gasket having an extremely long life and capable of providing good insulation and maintaining an effective seal.

A further object of the invention is to provide a tubular gasket for refrigerator doors or the like which reduces abrasion due to movement of the gasket in the region of the hinge and eliminates puckering of the horizontal sections of the gasket.

Other objects, uses and advantages of the present invention will become apparent to those skilled in the art from the following description and claims and from the drawings in which:

FIGURE 1 is a front elevational view on a reduced scale showing a refrigerator employing the gasket of the present invention, the door being shown in closed position;

FIGURE 2 is a fragmentary, horizontal, sectional view taken substantially on the line 2—2 of FIG. 1 and on a larger scale;

FIGURE 3 is a fragmentary, horizontal sectional view similar to FIG. 2 and on the same scale showing the position of the parts during closing of the door when the gasket initially engages the front face of the refrigerator;

FIGURE 4 is a sectional view on an enlarged scale showing a cross section of the gasket of FIGS. 1, 2 and 3;

FIGURE 5 is a sectional view similar to FIG. 4 showing a modified form of gasket constructed according to the present invention; and FIGURE 6 is a transverse sectional view similar to FIG. 4 and on a slightly smaller scale showing another

2 modified form of refrigerator gasket constructed according to this invention.

Referring more particularly to the drawings, in which like parts are identified by the same numerals throughout the several views, FIG. 1 shows a conventional refrigerator R of rectangular, horizontal and vertical cross section having a body 1 with floor-engaging legs 2 and having a swinging door 3 with a handle 4 at the free end thereof. The door is pivotally mounted on the body 1 to swing about a vertical axis by a conventional hinge means including horizontal hinge plates 5 and cylindrical, vertical, coaxial hinge pins 6. The body 1 of the refrigerator cabinet is constructed in the conventional manner with a thick layer of insulating material 7 covered by an outer steel shell 8, and the door 3 is similarly constructed with a relatively thick insulating layer 9 covered by a steel shell 10.

The shell 8 has a flat, vertical, face portion 11 extending completely around the door opening for engaging the gasket to provide a seal. The inner wall 12 of the door shell 10 has flat inner and outer peripheral portions 13 and 14 which extend around the door opening like the face portion 11. The portions 13 and 14 are parallel to the face portion 11 when the door is held in its fully closed position as shown in FIG. 2. When the door is in this position, there is a relatively wide space between the portion 11 and the portion 13 which may have a horizontal width about one-half inch or more for a standard size refrigerator. The margin of the inner portion 13 is covered with a sheet-metal holding strip 15 which extends all the way around the door opening to hold the gasket in place. A series of screws 16 are screwed into the transposed portions 13 and 14 to affix the holding strip 15 in place. The outer wall portion 14 extends under the portion 13 and has a reinforcing flange 17 at its inner end. The strip 15 is flat but has a flange portion 18 of generally arcuate hook-shaped cross section extending outwardly beyond the end edge of the wall portion 13 for clamping the gasket in place.

The refrigerator structure described above is conventional and may be employed with conventional door gaskets as disclosed, for example, in United States Patent No. 2,908,949. However, gaskets known prior to this invention have not performed satisfactorily in refrigerators of the type shown in the drawings hereof since there is a very substantial wiping action on the gasket as the door is closed tending to move the gasket transversely and to cause sliding of the sealing surfaces of the gasket against the face of the refrigerator. This tends to wear out the gasket.

The gasket of the present invention is shaped quite differently from any gaskets previously used and is especially constructed to provide effective sealing for a long period of time, particularly in a refrigerator of the type shown wherein the gasket is near the hinge axis. The gasket is shaped so as to function effectively when made of pliable polymeric materials such as homopolymers of vinyl chloride, copolymers of vinyl chloride and vinyl acetate, polyethylene, polyurethanes, or similar extrudable materials having the necessary flexibility. Plasticized polyvinyl chloride is preferred due to its low cost and the fact that it is easily provided with the desirable color. Various rubbers and rubbery compositions may also be used, however.

The gasket of this invention is particularly advantageous because it provides a large, insulating, dead air space about the door, provides a relatively wide sealing area against the face of the refrigerator, and has a very low permanent set due to its peculiar shape. The gasket also is highly advantageous due to the ability of the sealing portion thereof to move transversely without sliding and without imparting horizontal forces to the horizontal portions of the gasket tending to wrinkle the latter portions.

FIGURE 4 shows a plasticized polyvinyl chloride sealing gasket in its normal unstressed condition prior to being mounted on the refrigerator R. The gasket comprises a substantially flat, stiff, inner wall or base 20 of substantial thickness having an anchoring section 21 of generally L-shaped cross section and an inclined sealing flange 22 with its end generally in alignment with the flat lower portion 23 of the anchoring section. Said lower portion has four sealing ribs 19 and an inwardly projecting, relatively thick, fastening rib 24, as best shown in FIG. 4 which is drawn to scale.

This figure illustrates the cross section of the gasket G throughout the length thereof. A flexible tapered outer side wall 25 is provided integral with the base 20, and a relatively thin outwardly projecting flexible sealing portion 26 of rounded cross section forms a continuation of said side wall. As herein shown, the wall 25 gradually decreases in thickness in a direction away from the base and is relatively thick at the base. A stiff relatively thick outer wall 27 is supported in cantilever fashion and extends in generally the same direction as the flat wall 20 to the inner end of the portion 26, the portions 26 and 27 being united at the junction 28 where the direction of the walls abruptly changes. In the region of said junction the direction may, for example, change 20 to 90 degrees between points spaced apart laterally a distance of only 0.05 inch.

The gasket G has a stiff, relatively thick, inner side wall 30 extending in the same direction as the flange 22 and has a stiff, relatively thick, connecting wall 31 extending in a different direction and terminating at the upper end of the wall 30 to provide a longitudinal air chamber 32 of triangular cross section adjacent to the larger air chamber 33 formed by the walls 20, 25, 26, 27 and 31. The latter chamber has a volume at least eight times that of the chamber 32 and the larger chamber preferably has a width about twice its height. The connecting wall 31 is optional and may be omitted as in the gasket of FIG. 6.

A modified form of gasket G' is shown in FIG. 5 which is also drawn to scale to show the exact cross section throughout the length of the gasket. The parts of the gasket G' similar to the parts of the gasket G are identified by numbers 100 greater than the numbers identifying corresponding parts of the gasket G. The gasket G' comprises a flat, inner wall or base 120 having an anchoring section 121 of L-shaped cross section at one side thereof and an inclined sealing flange 122 at the opposite side thereof. The flat lower portion 123 of the base has a thick upwardly projecting fastening rib 124 and a series of small sealing ribs 119 for engaging the face of the door throughout the periphery of the door opening like the sealing ribs 19. The gasket has a flexible outer side wall 125 with a stiff, relatively thick, base portion 125a of tapered cross section to provide lateral stability and has a thin, flexible, outwardly projecting, sealing portion 126 of rounded cross section terminating at the the free end of a stiff, relatively thick, outer wall 127. The end portion 129 of the wall 127 projects slightly beyond the junction 128 of the walls 126 and 127. The stiff wall 127 is directly connected to the base 120 and, therefore, differs from the construction of the gasket G. The gasket G' has only one air chamber 133 which extends substantially the full width of the gasket.

Another modified form of gasket G'' is shown in FIG. 6 which is drawn to scale to show the exact cross section throughout the length of the gasket. The overall size of the gasket G'' may be substantially the same as that of the gasket G. Each of the gaskets shown herein is preferably extruded so as to have a uniform cross section throughout the length thereof. The parts of the gasket G'' similar to the parts of the gasket G are identified by the same numbers with a suffix $a$ added thereto.

The gasket G'' is shown in its normal unstressed condition prior to being mounted on the refrigerator R and comprises a substantially flat, stiff inner wall or base 20a of substantial thickness having an anchoring section 21a of generally L-shaped cross section at one side thereof and an inclined sealing flange 22a at the opposite side thereof. The flat lower portion 23a of the base has a series of small sealing ribs 19a for engaging the door throughout the periphery of the door opening like the sealing ribs 19, it being understood that the anchoring portion of the gasket G'' may be the same as that of the gasket G to fit the same door or the refrigerator may be constructed in a slightly different manner as is well known in the art to receive the anchoring portion 23a. Conventional means may be employed to attach the gasket of this invention to the refrigerator and such means form no part of this invention.

The gasket G'' has a flexible outer side wall 25a integral with the base 20a and a relatively thin outwardly projecting flexible sealing portion 26a of rounded cross section forming a continuation of said side wall. As shown in FIG. 6 the outer side wall 25a is relatively thin and has substantially the same thickness as the sealing portion 26a. A stiff relatively thick outer wall 27a is supported in cantilever fashion and extends generally in the direction of the wall 20 to the inner end of the portion 26a, the portions 26a and 27a being united at the junction 28a where the direction of the walls abruptly changes (i.e., a change of 20° to 80° within a space of 0.05 inch). As herein shown, the thickness of the wall 27a gradually decreases in a direction toward the junction 28a. The gasket G'' has a stiff relatively thick inner side wall 30a extending generally in the same direction as the flange 22a. As herein shown, a ridge or lip 50 is provided at the junction of the walls 27a and 30a to improve the appearance of the gasket and to provide convenient means for gripping the gasket. The air chamber 33a formed by the walls 20a, 25a, 26a, 27a and 30a is somewhat larger than the chamber 33 of the gasket G.

A connecting wall similar to the wall 31 may be provided to reinforce the wall 30a, but this is not necessary since the wall 30a is relatively thick and stiff and is sufficiently strong to resist the transverse forces applied to the gasket G''.

The gaskets G, G' and G'' may be mounted on the refrigerator as indicated in FIG. 1. As illustrated, the gaskets are straight and are cut at 45° angles at their ends which are then jointed by suitable adhesives to provide square corners. The gasket G is employed on the refrigerator R to provide a vertical section 40 at the hinge side of the door, a vertical section 41, of the same size, at the free end of the door and top and bottom horizontal sections 42 and 43 of the same length connected to the top and bottom corners 44 and 45, respectively, of the vertical sections.

Gaskets have been arranged as indicated in FIG. 1 prior to this invention, but the wiping action adjacent the hinge has imparted a horizontal force from the vertical portion of the gasket adjacent the hinge to the horizontal sections of the gasket above and below the door opening so as to wrinkle or pucker the surface of the horizontal sections of the gasket, thereby disturbing the seal between the door and the face of the refrigerator. The wrinkles usually form in the horizontal sections within one inch of the ends thereof nearest the hinge. The gasket of the present invention overcomes such difficulties, the stiff portions 30 retaining their normal shape when the gasket is compressed and moved transversely relative to the face 11 of the refrigerator from the position shown in FIG. 3 to the position shown in FIG. 2.

The wiping action due to the nearness of the gasket to the axis of the hinge pins 6 and the substantial distance between such axis and the face 11 of the refrigerator is illustrated in FIGS. 2 and 3. FIG. 3 illustrates the normal relaxed position of the assembled gasket at the instant it first contacts the sealing face 11 of the refrigerator. It will be noted that the flange portion 18 of the holding strip compresses the fastening rib of the gasket and forces the four sealing ribs 19 tightly against the inner wall portion 14 of the refrigerator to hold the gasket firmly in place and to provide an effective seal against the inner wall of the door. This holding action is effected by the strip 15 throughout the periphery of the door opening.

When the door 3 is moved through the angle *a* from the slightly open position shown in FIG. 3 to the fully closed position shown in FIG. 2, the thin flexible sealing portion 26 of the gasket engages the face 11 of the refrigerator throughout the periphery of the refrigerator door opening and is caused to curl in cross section due to the substantial transverse movement of the gasket G relative to the surface 11. The distance between the surface 11 and the flat wall portion 13 of the fully closed door 3 is greater than the distance between said portion 13 and the outer wall portion 27, whereby the portions 30 and 31 do not contact the surface 11 and are not caused to change their shape. The triangular cross section provided by the connecting wall 31 provides the gasket with a semi-rigid cantilever support for the outer wall 27, but such wall 31 may be omitted as in the gasket of FIG. 6.

The parts of the refrigerator are drawn to scale in FIGS. 2 and 3 to make it clear how the wiping action is obtained. It will be noted that, as herein shown, the vertical axis of rotation of the door 3 provided by the hinge pins 6 is spaced in the neighborhood of 1½ inch from the flat outer peripheral portion 14 of the inner door wall and that the central vertical axis of the gasket section 40 is spaced about 1 to 1½ inches from such axis. As a result, the fixed side of the stiff outer wall 27 at the junction of the walls 30 and 31 moves 0.1 to 0.2 inch laterally relative to the surface 11 as the door is moved from the position shown in FIG. 3 to the position shown in FIG. 2. The dimensions will, of course, vary considerably on different refrigerators. The free side 28 of the outer wall 27 swings toward the door due to the wiping action so as to cause the curling and folding of the sealing portion 26 as indicated in FIG. 2.

The gasket is shaped in accordance with the distance between the surface 11 and the wall portion 14 and in accordance with the location of the hinge axis so that the gasket can change shape as indicated in FIGS. 2 and 3 without sliding transversely on the surface 11. This eliminates abrasion on the sealing portion 26 and thereby greatly increases the life of the gasket. The sealing portion 26 is extremly thin so as to have a wide area of contact against the surface 11 when the door is closed as shown in FIG. 2 so as to maintain a very effective seal against the surface 11 throughout the periphery of the door opening.

The particular cross-sectional shape of the gasket is particularly desirable because the permanent set is minimized and the gasket has a maximum life when made of flexible plastic.

The preferred pliable polymeric material for the gasket G, G' or G" is a flexible polyvinyl chloride composition employing a suitable plasticizer and other compounding ingredients such as pigments, fillers, antioxidants, heat and light stabilizers and the like as is well known in the art. The plasticizers preferably include a monomeric plasticizer such as dioctylphthalate, dioctyladipate or the like and/or a polymeric plasticizer such as polyethylene sebacate or the like.

The cross section of the gasket may be uniform throughout the length of the gasket and may be as indicated in FIG. 4, which is drawn to scale, but it will be understood that the size of the gasket will vary for different refrigerators. A gasket of the type shown in FIG. 4 usually has an overall width of about 0.8 to 1.3 inches and an overall height of about 0.6 to 0.8 inch. The flat inner wall 20 preferably has a width of about 0.7 to 1 inch and the fixed side of the wall 27 at the junction of the walls 30 and 31 is preferably spaced from the wall 20 about 0.2 to 0.4 inch, it being understood that the supports 30 and 31 may be reduced in size or omitted as shown in FIG. 5 without losing all of the advantages of this invention. The distance from the flat wall 20 to the top of the flexible sealing portion 26 when the gasket is in its normal unstressed condition shown in FIG. 4 is 0.3 to 0.5 inch and preferably about 0.35 to 0.5 times the width of the flat wall 20. The distance from the junction 28 at the free side of the wall 27 to the outermost point of the sealing portion 26 when the gasket is in the free unstressed condition is 0.1 to 0.2 inch and preferably at least one-fourth the distance from the flat wall 20 to the outermost point of the sealing portion 26.

The width of the stiff outer wall 27 shown in FIG. 4 is usually about 0.4 to 0.6 times the width of the flat wall 20, but this depends considerably on the location of its fixed end relative to the adjacent side of the wall 20. The free side of the wall 27 at 28 is usually spaced from the side of the flat wall 20 at its junction with the flange 22 a distance equal to about 0.5 to 0.7 times the width of the flat wall 20 measured in a direction parallel to the wall 20. The gasket shown in FIG. 4 falls within the ranges described above.

The wall 27 must be flexible to permit bending from the position shown in FIG. 3 to the position shown in FIG. 2 but it should be sufficiently stiff to resist such bending and to retain its generally flat shape as it is bent while effectively resisting any transverse forces exerted due to the relative transverse movement between the gasket G and the contacting surface 11. The wall portion 25 may have some stiffness so as to act as a spring and so as to resist transverse movement. It should have sufficient stiffness to prevent wrinkling. The portion 26 is preferably very thin so that it can curl readily as indicated in FIG. 2, and so that it has a wide contact with the surface 11 when compressed. It should have sufficient thickness so as to return to the generally arcuate cross section shown in FIG. 3 when the door is opened. Such thickness is usually no more than about half the average thickness of the wall 27 and no greater than the thickness of the side wall portion 25.

The wall portion 25 may be thickened at the base and gradually reduced in thickness toward the portion 26, and, in such case, the rate of change of thickness is preferably substantially uniform so that there are no sudden changes in thickness anywhere along the cross section of the gasket from the wall 20 to the wall 27. The minimum thickness of the wall portion 25 may, for example, be up to 50 percent less than its average thickness or may be in the neighborhood of 50 percent less than its maximum thickness which is the case in the gasket shown in the drawings. The average thickness of the wall portion 25 is preferably about 0.020 to 0.035 inch when such wall portion is tapered in cross section, but such thickness may be no greater than the thickness of the sealing portion 26.

The thickness of the sealing portion 26 is preferably more uniform and usually varies no more than about 10 percent substantially throughout its length but this is not essential. The thickness is preferably sufficiently great so that the gasket is free of sharp bends when it is compressed as shown in FIG. 2 except in the region adjacent the junction 28. The thickness must be sufficient to maintain a sealing pressure against the surface 11 when the gasket is compressed but insufficient to interfere with flexing and curling movement of the gasket as indicated in FIG. 2.

When the gasket is made of plasticized polyvinyl chloride or similar plastic the thickness of the sealing portion 26 is less than 0.03 inch but is preferably about 0.015 to 0.025 inch. The gasket gradually increases in thickness at a substantially uniform rate from the portion 26 to the base of the side wall portion 25.

The wall portions 126 and 127 of the modified gasket G' of FIG. 5 preferably have thicknesses substantially the same as thicknesses of the wall portions 26 and 27 respectively. It will be noted, however, that the wall portion 127 is considerably wider than the wall portion 27 due to the absence of the walls 30 and 31.

The gaskets G, G' and G" function similarly, and the important dimension is the distance from the fixed side of the outer wall 27, 27a or 127 to the fixed side of the side wall 25, 25a or 125, respectively, and the distances from such fixed sides to the junction 28, 28a or 128 measured laterally along the surface of the gasket. The width of the portions 25 and 26 of the gasket G measured along the surface thereof from the junction 28 to the flat inner wall 20 is preferably substantially less than the distance from the latter side of the top wall 20 to the fixed side of the wall 27 where it joins the wall 30 and is preferably at least three-fourths of such distance, and the width of the wall 27 is preferably about one-half to two-thirds of such distance, the same dimensions being preferred for the corresponding portions 25a, 26a and 27a of the gasket G".

The width of the portions 125 and 126 of the gasket G' measured along the outer surface thereof from the junction 28 to the junction with the flat inner wall 120 is preferably substantially less than the width of the flat wall 20 and is preferably at least two-thirds of the latter width, the width of the wall 27 from the fixed side thereof to the junction 128 being preferably about one-half to three-quarters of said latter width.

The flat wall 20 and the similar wall 120 usually have a thickness greater than the flexible walls of the gasket. Such thickness is usually about 0.05 to 0.07 inch as indicated in the drawings, but it will be understood that such thickness may vary considerably since the base portions of the gasket need not be flexible.

It will be apparent that the dimensions of the gasket will depend to a great extent on the design of the refrigerator and the location of the gasket relative to the hinge. The shape of the gasket is particularly dependent upon the amount of lateral movement of the gasket relative to the face of the refrigerator from the instant the gasket first contacts the refrigerator as indicated in FIG. 3 until the door is fully closed as indicated in FIG. 2. In general, an increase in this relative transverse movement due to the wiping action at the hinge requires an increase in the width of the portions 25 and 26 measured along the surface thereof. The total width of the portions 25 and 26 is greater than the width of the wall 27 by an amount which is generally proportional to the amount of transverse movement of the gasket G relative to the surface 11 during closing of the door, and such amount is usually at least 0.20 inch and preferably at least one and one-half times the amount of transverse movement of the wall 27 relative to the refrigerator surface 11 measured in a direction parallel to such surface 11 from the time the gasket first contacts said surface 11 as shown in FIG. 3 until the door is fully closed as shown in FIG. 2.

The thicknesses of the walls 25 and 27 may be sufficient so that these walls remain stiff and serve as springs to hold the thin sealing portion 26 in sealing engagement with the surface 11 when the gasket is compressed as shown in FIG. 2. The tapered cross section of the wall portion 25 assists in providing the proper spring action while at the same time improving the permanent set characteristics of the gasket. The wall 27 preferably is inclined relative to the flat wall 20 somewhat like the wall 127 so as to function more efficiently as a cantilever spring to maintain sealing engagement of the portion 26 and the free end portion of the wall 27 may be reduced in thickness somewhat (i.e., to about .030 inch) to reduce the stiffness somewhat at the free end.

The thickness at the free end, however, should be materially greater than the thickness of the adjacent portion 26 so that the portion 26 bends sharply adjacent the junction 28 as indicated in FIG. 2. The outer wall portion 27, therefore, serves as spring means for biasing the flexible portion 26 toward the surface 11 and for maintaining sealing contact between the gasket and the portion 11 throughout the periphery of the door opening when the door is closed as shown in FIG. 2. The portions 25 and 26 should have sufficient thickness so as to maintain a substantial sealing pressure against the surface 11 when the door is closed and to avoid wrinkling. The thickness should be sufficient so that the gasket retains a cross section generally as shown in FIG. 2 when the door is closed.

The gasket of the present invention may be employed on most standard refrigerators. It has advantages even if there are no serious problems due to the transverse movement on the hinge side of the door. The refrigerator R shown herein is of a conventional type and would have a door 3 with a height of 3 to 6 feet and a width of 2.5 to 4 feet.

The gasket of this invention is particularly advantageous for refrigerators having a relatively wide gap between the door and the body of the cabinet and having the gasket located very close to the vertical axis of the door hinge.

It will be understood that the above description is by way of illustration rather than limitation and that, in accordance with the provisions of the patent laws, variations and modifications of the specific devices shown herein may be made without departing from the spirit of the invention.

Having described our invention, we claim:

1. A hollow flexible sealing strip for refrigerators and the like having a uniform, closed, hollow cross section throughout its length, said strip comprising in the normal unstressed condition a stiff, relatively thick inner wall, a relatively flexible side wall integral with said inner wall and extending in a direction generally perpendicular thereto, a stiff, relatively thick outer wall supported at and along one edge portion thereof from said inner wall at a location spaced transversely of the inner wall from and generally transversely to the juncture of said side wall with said inner wall, said outer wall extending cantilever fashion toward said side wall and being in the form of a spring the unsupported edge portion of which is spaced from said inner wall and said side wall, and a relatively thin flexible sealing portion extending between and fixed to the outer portion of said side wall and the unsupported edge portion of said outer wall, said sealing portion forming a re-entrant angle with said outer wall and projecting a substantial distance outwardly from said outer wall in a direction away from said inner wall, the cross sections of said inner wall, side wall, outer wall and sealing portion comprising said closed hollow cross section.

2. A sealing strip as defined in claim 1 wherein said last-named distance is at least about one-fourth the distance from said inner wall to the outermost part of said sealing portion when the sealing strip is in its normal unstressed condition and wherein the parts of said strip including said inner, outer and side walls and said sealing portion define a large closed air chamber of uniform laterally elongated cross section.

3. In a refrigerator or other closed receptacle having an opening therein and a door for closing said opening, the improvement which comprises a sealing strip mounted between the door and the body of the receptacle and extending around the margin of said opening, said sealing strip providing an air chamber of uniform transversely elongated, closed, hollow cross section at one side of said door, said sealing strip including a relatively thick, substantially flat inner wall mounted on said door, means preventing entry of air between said inner wall and said door, a relatively flexible side wall having a fixed edge portion integral with said inner wall extending in a direction generally perpendicularly thereto at one side of said air chamber and having a distal edge portion spaced from said fixed edge portion, a stiff, relatively thick outer wall supported at and along one edge thereof from said inner wall and extending in cantilever fashion toward said side wall, said outer wall being in the form of a spring having its supported edge located at the opposite side of the air chamber at a location spaced transversely of the inner wall from and generally parallel to the juncture of said side wall and said inner wall and having an unsupported edge portion spaced from said supported edge thereof, said inner wall and said side wall and located at approximately the center of said air chamber, and a relatively thin flexible sealing portion extending between and fixed to the outer portion of said side wall and the unsupported edge portion of said outer wall, said sealing portion forming a re-entrant angle with said outer wall and projecting outwardly from said outer wall in a direction away from said inner wall for engagement with said body when the door is closed to prevent entry of air between said door and said body, said outer wall exerting resilient pressure to hold said sealing portion against said body to maintain said seal, the cross sections of said inner wall, side wall, outer wall and sealing portion comprising said closed hollow cross section.

4. A combination as defined in claim 3 wherein said air chamber is located at a side of the door which is hingedly connected to said body and the pivotal axis of the door is so located relative to the initial line of contact of said sealing portion and said body that the movable side of said outer wall moves at least about 0.1 inch laterally relative to said body from the time the sealing strip initially contacts said body until the door is in its normal closed position, said sealing portion curling toward said outer wall to permit such movement and to minimize transverse movement between said sealing portion and said body tending to wear out the sealing strip.

5. A hollow flexible sealing strip having a uniform closed, hollow cross section throughout its length, said strip comprising in the normal unstressed condition a stiff, relatively thick, substantially flat inner wall of substantial width, a relatively flexible side wall integral with said inner wall along one edge portion of said inner wall and generally perpendicular to said inner wall, a stiff relatively thick substantially flat outer wall supported at one edge portion thereof from the other edge portion of said inner wall and extending toward said side wall in a direction generally perpendicular to said side wall, said outer wall being in the form of a cantilever spring the unsupported edge portion of which is spaced from said inner wall and from said side wall, and a relatively thin flexible sealing portion extending between and fixed to the unsupported edge portion of said outer wall and the outer portion of said side wall, said sealing portion forming a re-entrant angle with said outer wall and projecting a substantial distance outwardly from said outer wall in a direction away from said inner wall, said sealing portion and said side wall providing a gradually curved wall when the strip is normally unstressed, the cross sections of said inner wall, side wall, outer wall and sealing portion comprising said closed hollow cross section.

6. A sealing strip as defined in claim 5 wherein the material forming the strip is plasticized polyvinyl chloride and wherein the strip gradually decreases in thickness from said one side of said inner wall to said sealing portion.

7. A sealing strip as defined in claim 5 wherein said outer wall is supported in cantilever fashion on said inner wall by a pair of relatively thick connecting walls located near said opposite side of the inner wall, said outer wall being free to swing toward said inner wall and having sufficient thickness to maintain its shape when the strip is subjected to transverse forces sufficient to curl said sealing portion.

8. A hollow flexible sealing strip for refrigerators or the like having a uniform closed, hollow cross section throughout its length, said strip comprising in the normal unstressed condition a stiff, relatively thick, substantially flat inner wall of substantial width, a relatively flexible side wall integral with said inner wall along one edge portion of said inner wall and generally perpendicularly to said inner wall, a stiff, relatively thick, substantially flat outer wall supported at one edge portion thereof from the other edge portion of said inner wall and extending toward said side wall in a direction inclined less than 30 degrees from said inner wall, said outer wall being in the form of a cantilever spring the unsupported edge portion of which is spaced from said inner wall and said side wall, and a relatively thin flexible sealing portion extending between and fixed to the unsupported edge portion of said outer wall and the outer portion of said side wall, said sealing portion forming a re-entrant angle with said outer wall and defining an arcuate wall of predetermined cross section extending a substantial distance from said outer wall in a direction away from said inner wall, the distance from the juncture of said outer wall and said sealing portion to the outermost point of said sealing portion being at least one fourth the distance from said outermost point of said sealing portion to said inner wall when said sealing strip is in its unstressed condition, the thickness of said sealing portion being such as to enable said portion to hold its arcuate shape when unstressed and to permit said sealing portion to be deflected toward said outer wall while maintaining an arcuate cross section when said sealing portion is engaged by a surface having relative movement inwardly toward said inner wall and laterally toward the supported edge portion of said outer wall, the cross sections of said inner wall, side wall, outer wall and sealing portion comprising said closed hollow cross section.

9. A sealing strip as defined in claim 1 wherein said side wall has a relatively thick stiff portion integral with said inner wall for increasing the lateral stability of the gasket.

10. A sealing strip as defined in claim 1 wherein said side wall has a generally uniform thickness greater than but not substantially greater than the thickness of said sealing portion and sufficient to maintain a predetermined shape when the gasket is unstressed.

11. A sealing strip as defined in claim 8 wherein the average thickness of said outer wall is not substantially less than twice the average thickness of said sealing portion, the thickness and direction of the strip changing abruptly at the junction of said outer wall and said sealing portion.

12. A combination as defined in claim 3 wherein the total width of the said side wall and said sealing portion measured along the surface thereof from the junction of said outer wall and said sealing portion to the junction of said inner wall and said side wall is no greater than the lateral distance from said last-named junction to the fixed side of said outer wall and is at least two-thirds of said last-named distance.

13. A hollow flexible strip for sealing the joint between door and cabinet of a refrigerator or the like, said strip having a uniform closed, hollow section throughout its length and, in its unstressed condition, comprising a relatively thick stiff inner wall, a relatively flexible side wall extending angularly from said inner wall and having an inner edge integrally joined to the inner wall along a first line of connection and an outer edge spaced from and parallel to said line of connection, an outer wall overlying the inner wall in generally spaced relation and having an inner edge integrally joined to the outer wall along a second line of connection spaced from and parallel to said first line of connection, said outer wall being cantilevered from and relative to said inner wall and having an outer edge movable toward and away from the inner wall, and a sealing wall thinner and more flexible than any of said inner, side and outer walls, said sealing wall extending between and being integrally connected to said outer edge of the outer wall along a third line of connection paralleling and spaced from both said first and second lines of connection and said outer edge of the side wall along a fourth line of connection parallel to and spaced from each of said first, second and third lines of connection, said sealing wall being thinner and more flexible than said outer wall and including an intermediate portion spaced outwardly away from the inner wall a greater distance than all portions of the side and outer walls, and said inner, outer, side and sealing walls providing a closed chamber extending lengthwise of the strip.

References Cited in the file of this patent
UNITED STATES PATENTS

| | | |
|---|---|---|
| 2,368,837 | Hubacher | Feb. 6, 1945 |
| 2,880,049 | Tarleton | Mar. 31, 1959 |
| 2,908,949 | Frehse | Oct. 20, 1959 |
| 2,942,308 | Naeser et al. | June 28, 1960 |
| 2,952,053 | Frehse | Sept. 13, 1960 |
| 2,954,592 | Parsons | Oct. 4, 1960 |
| 3,025,576 | Herman | Mar. 20, 1962 |
| 3,038,218 | Swaneck et al. | June 12, 1962 |